US012641153B2

(12) United States Patent
Mitra et al.

(10) Patent No.: US 12,641,153 B2
(45) Date of Patent: May 26, 2026

(54) DECENTRALIZED DATA SERVER AND MONITOR

(71) Applicant: STRIPE, LLC, South San Francisco, CA (US)

(72) Inventors: Debjani Mitra, Seattle, WA (US); Dounan Shi, South San Francisco, CA (US); Roman Zimine, Oakville (CA); Gary Licht, Briarcliff Manor, NY (US); Lisa Li, King City (CA)

(73) Assignee: STRIPE, INC., South San Francisco, CA (US)

( * ) Notice: Subject to any disclaimer, the term of this patent is extended or adjusted under 35 U.S.C. 154(b) by 172 days.

(21) Appl. No.: 18/627,718

(22) Filed: Apr. 5, 2024

(65) Prior Publication Data

US 2025/0317489 A1 Oct. 9, 2025

(51) Int. Cl.
*H04L 67/10* (2022.01)
*H04L 67/1014* (2022.01)
*H04L 67/1097* (2022.01)

(52) U.S. Cl.
CPC ...... *H04L 67/1097* (2013.01); *H04L 67/1014* (2013.01)

(58) Field of Classification Search
CPC ........................ H04L 67/1097; H04L 67/1014
See application file for complete search history.

(56) References Cited

U.S. PATENT DOCUMENTS

| | | | | |
|---|---|---|---|---|
| 12,271,877 | B1 * | 4/2025 | Ghosh ................... | H04L 9/3213 |
| 2021/0097431 | A1 * | 4/2021 | Olgiati .................. | G06N 5/046 |
| 2022/0083916 | A1 * | 3/2022 | Khan ...................... | G06N 20/00 |
| 2023/0075767 | A1 * | 3/2023 | Bradley ............. | G06Q 30/0234 |
| 2024/0057026 | A1 * | 2/2024 | Dai ....................... | H04L 5/0051 |

* cited by examiner

*Primary Examiner* — Scott C Anderson
(74) *Attorney, Agent, or Firm* — FINNEGAN, HENDERSON FARABOW, GARRETT & DUNNER, LLP

(57) ABSTRACT

A server computer system includes a decentralized architecture that receives at a central server, parameter values provided by one or more parameter servers. The parameter values are associated with a first parameter. The central server determines a global parameter value based on the parameter values, and persists the global parameter value to a database. The central server transmits the global parameter value to one or more second servers that each determine a local parameter value also corresponding to the first parameter. Each of the one or more second servers transmits the local parameter to a client and insulates the central server from interactions with the client.

20 Claims, 6 Drawing Sheets

INPUT PARAMETER
VALUES (E.G. RATES)
304

RATE MONITOR ENGINE 302

RULE INPUT
320

MONITORING
306

RULES INTERFACE (E.G.,
GRPC SERVER) 318

READ/WRITE RULE

DATABASE 312

CONSTRUCT
GLOBAL
PARAMETER
308

WRITE RULE

DYNAMIC
RULES 316

READ

PERSIST GLOBAL
PARAMETETER
310

READ

STATIC RULES
314

QUEUE WORKER 322

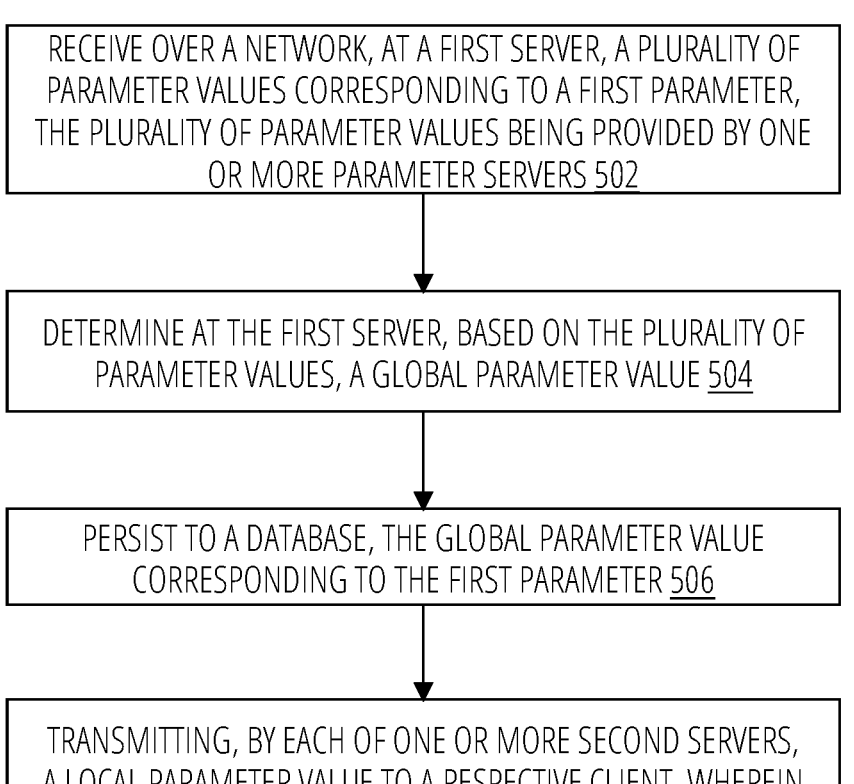

RECEIVE OVER A NETWORK, AT A FIRST SERVER, A PLURALITY OF PARAMETER VALUES CORRESPONDING TO A FIRST PARAMETER, THE PLURALITY OF PARAMETER VALUES BEING PROVIDED BY ONE OR MORE PARAMETER SERVERS 502

DETERMINE AT THE FIRST SERVER, BASED ON THE PLURALITY OF PARAMETER VALUES, A GLOBAL PARAMETER VALUE 504

PERSIST TO A DATABASE, THE GLOBAL PARAMETER VALUE CORRESPONDING TO THE FIRST PARAMETER 506

TRANSMITTING, BY EACH OF ONE OR MORE SECOND SERVERS, A LOCAL PARAMETER VALUE TO A RESPECTIVE CLIENT, WHEREIN THE LOCAL PARAMETER VALUE IS DETERMINED BY EACH OF THE ONE OR MORE SECOND SERVERS BASED ON THE GLOBAL PARAMETER VALUE, AND THE LOCAL PARAMETER VALUE IS DIFFERENT FROM AT LEAST ONE OF THE PLURALITY OF PARAMETER VALUES PROVIDED BY THE ONE OR MORE PARAMETER SERVERS 508

FIG. 5

DECENTRALIZED DATA SERVER AND MONITOR

BACKGROUND

Data processing systems may comprise one or more computing devices that are connected over a wired and/or wireless communication medium. This medium, the communication protocols used by the various computing devices, and intermediate devices, may be referred to as a computer network. A data processing system may act as a server which determines, retains, and transmits data electronically over the computer network to a client. A server may have a variety of real-world application such as for commercial transaction processing servers, media access servers, customer relationship management servers, data management servers, medical servers, etc., as well as a combination of such servers.

BRIEF DESCRIPTION OF THE DRAWINGS

The present disclosure will be understood more fully from the detailed description given below and from the accompanying drawings of various embodiments, which, however, should not be taken to limit the embodiments described and illustrated herein, but are for explanation and understanding only.

FIG. 5 shows a flow diagram of a process for monitoring and serving one or more parameters with a decentralized architecture, according to an embodiment.

DETAILED DESCRIPTION

Figure 1:
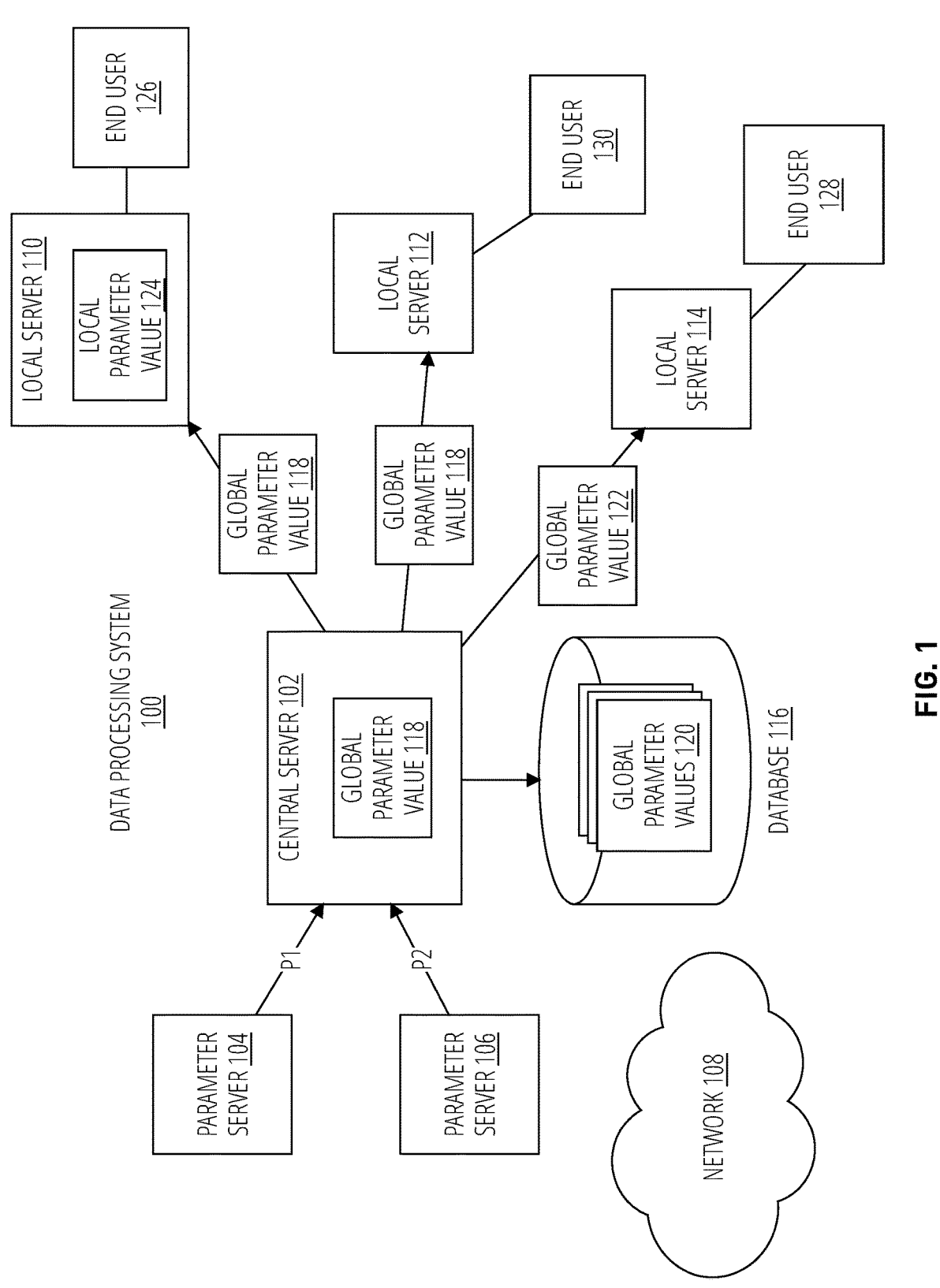
FIG. 1 shows an example of a decentralized data processing system, in accordance with an embodiment.

In the following description, numerous details are set forth. It will be apparent, however, to one of ordinary skill in the art having the benefit of this disclosure, that the embodiments described herein may be practiced without these specific details. In some instances, well-known structures and devices are shown in block diagram form, rather than in detail, in order to avoid obscuring the embodiments described herein.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "determining", "processing", "storing", "detecting", "persisting", "completing", "sending", "transmitting", "monitoring", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The embodiments discussed herein may also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the embodiments discussed herein are not described with reference to any particular programming language. It will be appreciated that a variety of programming languages may be used to implement the teachings as described herein.

A data processing system may be connected to a computer network and act as a server that provides data to facilitate various operations such as a transaction (e.g., a financial transaction). In some cases, parties in a transaction may obtain one or more parameters to help facilitate this transaction. For example, parties may need to use a currency exchange rate if the parties are making a transaction while simultaneously converting a first currency to a second currency. In such a case, a data processing system may be tasked with determining and maintaining one or more parameters (e.g., each parameter corresponding to a rate for a unique currency pair), monitoring these parameters for updates, fluctuations, and anomalies, and serving these parameters to numerous end users (e.g., parties in a transaction, or foreign exchange trading platforms) over a computer network.

Given that the volume of transactions may fluctuate and spike at different times, processing and transmission latency presents a challenge due to the real-time needs of each end user to service each potential transaction. Processing delays may be caused by sudden spikes of data requests, which could reduce responsiveness of the data processing system and ultimately cause unwanted delays in performing transactions. Further, given numerous different parameters (e.g., different exchange rates for different currencies) and the potential fluctuation of those parameters as determined based on numerous different sources, there is a need for a data processing system architecture that monitors for fluctuations and anomalies, and automatically reacts in response to the changes. In the present disclosure, unless otherwise stated as requiring human input, all operations may be performed automatically, that is, without instruction or input from a human.

A data processing system architecture and method thereof is described that centralizes monitoring and determination of the one or more parameters and decentralizes the dissemination of such parameters, once determined. A data processing system may be configured to receive over a network, at a first server, parameter values provided by one or more parameter servers (e.g., third party servers that each provide one or more currency exchange rates). The parameter values may correspond to a first parameter. The data processing system may (at the first server) determine, based on the parameter values, a global parameter value that may serve as a reliable central source when referencing the value of the first parameter. In some examples, a corresponding global parameter value may be determined for each unique pair of data points (e.g., currencies). The first server may persist each global parameter value to a database. This database may represent a collection of established and trusted values for each of the one or more parameters, and may be updated periodically and/or as needed. The first server may transmit the global parameter value to one or more second servers, where the one or more second servers form a decentralized portion of the system that insulates the first server from client requests. Each of the one or more second servers determines a local parameter value based on the global parameter. In some cases, this local parameter is the same as the global parameter, while in other cases, depending on one or more controls (described in other sections), the one or more second servers may generate the local parameter using the global parameter as a baseline. The local parameter value is different from at least one of the plurality of parameter values received by the first server. For example, the parameter values may be different values associated with the same parameter from different parameter servers, or different values associated with the same parameter received from the same parameter server over time. The first server determines the global parameter value when fluctuations associated with the same parameter from the same parameter server occur, or when different parameter servers provide different parameter values for the same parameter. Due to these fluctuations or differences, the local parameter is different from at least one of the plurality of parameter values provided by the one or more parameter servers. The local parameter value for the same parameter may be different across different ones of the second servers, depending on controls implemented at each of the second servers. Each of the one or more second servers is configured to transmit the local parameter to a respective client.

With such an architecture, the first server may reduce its network latency and computational latency by handing off the task of individualized customization of the global parameter value. Additionally, request handling for each transaction is redistributed to the decentralized second server nodes. Further, this architecture maintains a single source of fluctuation monitoring and determination of the global parameters at the first server, which promotes consistency and ease of maintenance across the data processing system.

In an embodiment, receiving the parameter values from the one or more parameter servers may include receiving the parameter values from an event stream of an event streaming system that is configured to receive the one or more parameters from the one or more servers.

In an embodiment, determining the global parameter based on the plurality of parameter values comprises detecting fluctuation of one of the plurality of parameter values associated with the first parameter based on previous values associated with the first parameter, and in response to the fluctuation satisfying a threshold, changing a designated one of the one or parameter servers and setting the global parameter value as one of the plurality of parameter values corresponding to the designated one of the one or parameter servers, or adjusting weighting to determine the global parameter value and applying the weighting to determine the global parameter value as a weighted combination of the plurality of parameter values.

In an embodiment, determining the global parameter value based on the plurality of parameter values comprises comparing a first of the plurality of parameter values from a first of the one or more parameter servers and a second of the plurality of parameter values from a second of the one or more parameter servers, and in response to a difference between the first of the plurality of parameter values and the second of the plurality of parameter values satisfying a threshold, changing a designated one of the one or parameter servers and setting the global parameter value as one of the plurality of parameter values corresponding to the designated one of the one or parameter servers, or adjusting weighting to determine the global parameter value and applying the weighting to determine the global parameter value as a weighted combination of the plurality of parameter values.

In an embodiment, the first server accesses the database to obtain the global parameter, and broadcasts the global parameter to the one or more second servers to transmit the global parameter value to the one or more second servers.

In an embodiment, the first server monitors the plurality of parameter values provided by the one or more parameter servers to detect a condition associated with: a difference between two of the plurality of parameter values satisfying a threshold, or a fluctuation of one of the plurality of parameter values associated with the first parameter based on previous values associated with the first parameter, and in response to detecting the condition, transmits a notification to an operator that is associated with the global parameter value.

In an embodiment, the first server receives, from the operator, an override value associated with the global parameter value, and updates the global parameter value in the database with the override value.

In an embodiment, determining the local parameter by the one or more second servers comprises receiving one or more controls from the first server, applying the one or more controls to the global parameter to compute the local parameter, or locking the local parameter for a time period defined by the one or more controls wherein the local parameter remains constant during the time period as the plurality of parameter values fluctuate, and persisting the local parameter. The one or more controls may be generated and transmitted by the first server in response to detecting, by the first server, fluctuation of one of the plurality of parameter values associated with the first parameter satisfying a threshold, or a difference between two of the plurality of parameter values associated with the first parameter satisfying a second threshold. For example, the first server may send to the one or more second servers, a signal to lock the local parameter value corresponding to the first parameter, which is stored and accessible by the one or more second servers, for a time period. In such a case, the local parameter value may be locked and deviate from the global parameter value at least for the time period that it is locked. Other controls may be sent from the first server to the one or more second servers which determine how the second server calculates the local parameter based on the global parameter. For example, the first server may send one or more control parameters that increase or decrease the local parameter relative to the global parameter, as described in other sections.

In an embodiment, the first parameter is one of a plurality of parameters, each representing a rate (e.g., a currency exchange rate) associated with a first exchange medium and a second exchange medium, and wherein a corresponding global parameter value is persisted in the database for each unique pairing of exchange mediums (e.g., a global parameter value for each supported currency exchange rate).

FIG. 1 shows an example of a decentralized data processing system, in accordance with an embodiment. Computing devices which may be referred to as servers (e.g., 102, 104, 106, 110, 112) may be connected over wired or wireless communication channels of a computer network 108. Network 108 may comprise transmitters, receivers, network switches, routers, firewalls, cables, etc. Network 108 may include a wide area network (WAN), a local area network (LAN), and/or the public internet. Computing devices may communicate with each other over network 108 using one or more communication protocols such as, for example, transmission control protocol/internet protocol (TCP/IP).

Central server 102 receives one or more parameter values (e.g., parameter value P1 and parameter value P2) from parameter server 104 and parameter server 106. In some cases, a single external source may be used to determine the global parameter value 118 based on the parameter value. In some cases, different parameter servers may provide parameter values associated with the same parameter to central server 102, in which case the central server 102 may apply a rule to determine the corresponding global parameter value 118 in view of conflicting parameter values. In an example, the rule includes pinning a parameter to a designed parameter server. That designated parameter server is the default source for that given parameter, and as a result, the central server 102 may set the global parameter value 118 as the parameter value received from the designated parameter server. The central server 102 may, in an example, determine the global parameter value 118 as a combination of the plurality of parameter values that are associated with the same parameter. For example, central server 102 may determine the global parameter value as a weighted average of the plurality of parameter values, where each weight may be determined and persisted for each parameter server. Each weight may be determined based on manual input, a default value, or both. Further, weights may be adjusted dynamically in response to detected changes as discussed further. In an example, a rule specifies that a global parameter is determined as a weighted average, and if a difference between parameter values from two parameter servers for that parameter is exceeded, then apply a second rule. The second rule may indicate a designated one of the parameter servers. The second rule may be the fallback rule. A first rule may be stored in memory and include a reference (e.g., a memory address or name) to a second fallback rule, to be applied for a given parameter if one or more conditions specified in the first rule are satisfied, such as a fluctuation, a difference, or other monitored condition respective of the parameter values that is described in other sections.

Once the global parameter value 118 is determined, the central server 102 persists the global parameter value 118 in database 116. This particular global parameter value 118 corresponds to the parameter that is associated with parameter value P1 and parameter value P2, assuming P1 and P2 represent the same parameter. More generally, database 116 may store a plurality of global parameter values 120, each corresponding to a unique one of the one or more parameters that may be transmitted from central server 102 to local servers 110, 112, and 114. Local servers 110, 112, and 114 may represent the decentralized portion of data processing system 100. In some examples, central server 102 may transmit the same global parameter (e.g., 118) to different local servers (e.g., 110, 112). In another example, central server 102 may transmit a different global parameter (e.g., 122, 118) to different servers (e.g., 122 to local server 114, and 118 to local server 110 or 112). The central server may provide a set of parameter values (e.g., different exchange rates) to each of the local servers. It should be understood that the central server 102 receives parameter values and updates the global parameter values 120 on a default cadence (e.g., a set periodic schedule). In some embodiments, the updates may occur on a custom schedule.

In an example, the central server 102 may transmit the global parameter value (118 or 122) to a respective local server in response to a request from the local server. In another example, the central server 102 may broadcast the global parameter to all local servers. In an example, each local server can subscribe to one or more of the stored global parameters 120. The central server 102 may store network address of the subscribers locally and broadcast the corresponding global parameter to each of the local servers that are subscribed to that particular global parameter. The broadcasting may be performed periodically, or in response to a change in a corresponding global parameter, or a combination thereof. The total number of transmissions of the global parameters to the local servers may be lower (e.g., significantly lower) than the total number of requests received by the local servers from end users (or intermediary servers) to service a transaction. As such, the request handling load on central server 102 is lower than if central server 102 were to handle each transaction request directly.

Each of the local servers may generate a respective local parameter value (e.g., 124) based on the global parameter value obtained from the central server 102. For example, local server 110 may generate local parameter value 124 and store this in memory that is accessible to local server 110 that is separate from database 116. The local parameter value 124 may be the same or different from global parameter 118, depending on how the local server 110 is configured to generate the local parameter value. For example, without a specified control signal, the local parameter 124 may be determined as the same as the global parameter 118. A control parameter from the central server 102 to one of the local servers may be applied at the local server to increase or decrease the local parameter value at that local server relative to the global parameter. Further, the control parameter may cause the local server 110 to lock the local parameter value 124 for a specified duration of time.

Each local server may provide the respective local parameter value to an end user 126 which may include a single party or multiple different parties. For example, local server 110 may provide local parameter value 124 to end user 126 which may use this parameter value to complete a digital transaction between two different parties of the end user 126. In another example, local server 114 may provide a local parameter value to end user 128. End user 128 may use this local parameter for its own purposes, for example, to digitally trade currencies, or to perform a different digital transaction between two different parties.

Although local servers 110, 112, and 114 are servers to end users, they may also be understood as clients from the perspective of central server 102. End users may communicate with local servers through one or more respective application programming interface (API) to request the local parameter from that local server. In such a case, central server 102 is insulated from the numerous requests from different end users (or intermediary clients) for these parameters, and can direct computational resources and logic to the various local servers (e.g., 110, 112, 114). Each of the local servers, in turn, generates a local parameter value, and handles the requests (either directly or indirectly) for transmitting the local parameter to the various local servers.

In an embodiment, the data processing system 100 may interface with each of the parameter servers (e.g., 104, 106) indirectly through an event stream server (not shown) that may comprise an event-driven architecture. The event stream server may obtain each of the parameter values from each of the parameter servers (e.g., through one or more respective API calls to each of the parameter servers) and provide those parameter values on an event stream for central server 102 to consume. An example of this is shown in FIG. 2.

The receiving of the parameter values, monitoring of the fluctuations of a particular parameter, determining the global parameter values, and adjusting of how these parameter values are determined as performed by central server 102 may be performed continuously as these parameters become available, and thus, may be computationally intensive. As mentioned, to simultaneously serve these global parameters to end users while performing these operations may introduce unwanted latency to the end users that rely on these global parameters (e.g., to perform a transaction), especially during potential spikes of activity (e.g., a high volume of transactions). The local servers 110, 112, 114 act as clients to the first server 102 to receive and process global parameters (e.g., 118, 122) to determine and persist a corresponding local parameter, respectively. The number of deployed local servers may be increased or decreased to support the activity, which decouples the front-end load (e.g., servicing end users) from the back-end load (e.g., receiving, monitoring, and processing the parameters) and reduces latency during potential activity spikes. Additionally, the local servers 110, 112, 114 may apply one or more controls locally to determine the corresponding local parameter based on the global parameter, and transmit this local parameter value to one or more end users or an intermediary service. The local servers insulate the central server from servicing individual API calls (e.g., on a transaction-level) so that the central server may ingest the parameters from the parameter providers, monitor fluctuations, and determine and persist global parameter values with reduced interruption. Additionally, each local server is insulated from performing high volume ingestion of parameter values (e.g., parameter P1, parameter P2) and fluctuation detection, which frees each local server to determine and provide the locally persisted parameter values to end users 126, 128, 130 with reduced latency. Further, the determined global parameter values stored in database 116 serve as a centralized source of data to each of the local servers, so that consistency and correctness of the provided global parameters 120 is maintained. These global parameter values 120 account for detected parameter fluctuations and differences. The central server 102 may disseminate one or more controls to each of the local servers 110, 112, 114, which determine how the respective local parameter is calculated or treated within each of the local servers. The management and control of the local servers (through the one or more controls) is thus centralized and configurable (e.g., automatically and/or manually) from a single point, as further described in other sections.

Although a certain number of parameter servers and local servers are shown here for example, it should be understood that FIG. 1 is shown as such for illustration purposes, and that the number of parameter servers and local servers may vary. Each local server may be dedicated to a particular client, to a category of clients, or to a particular geographical region.

Figure 2:
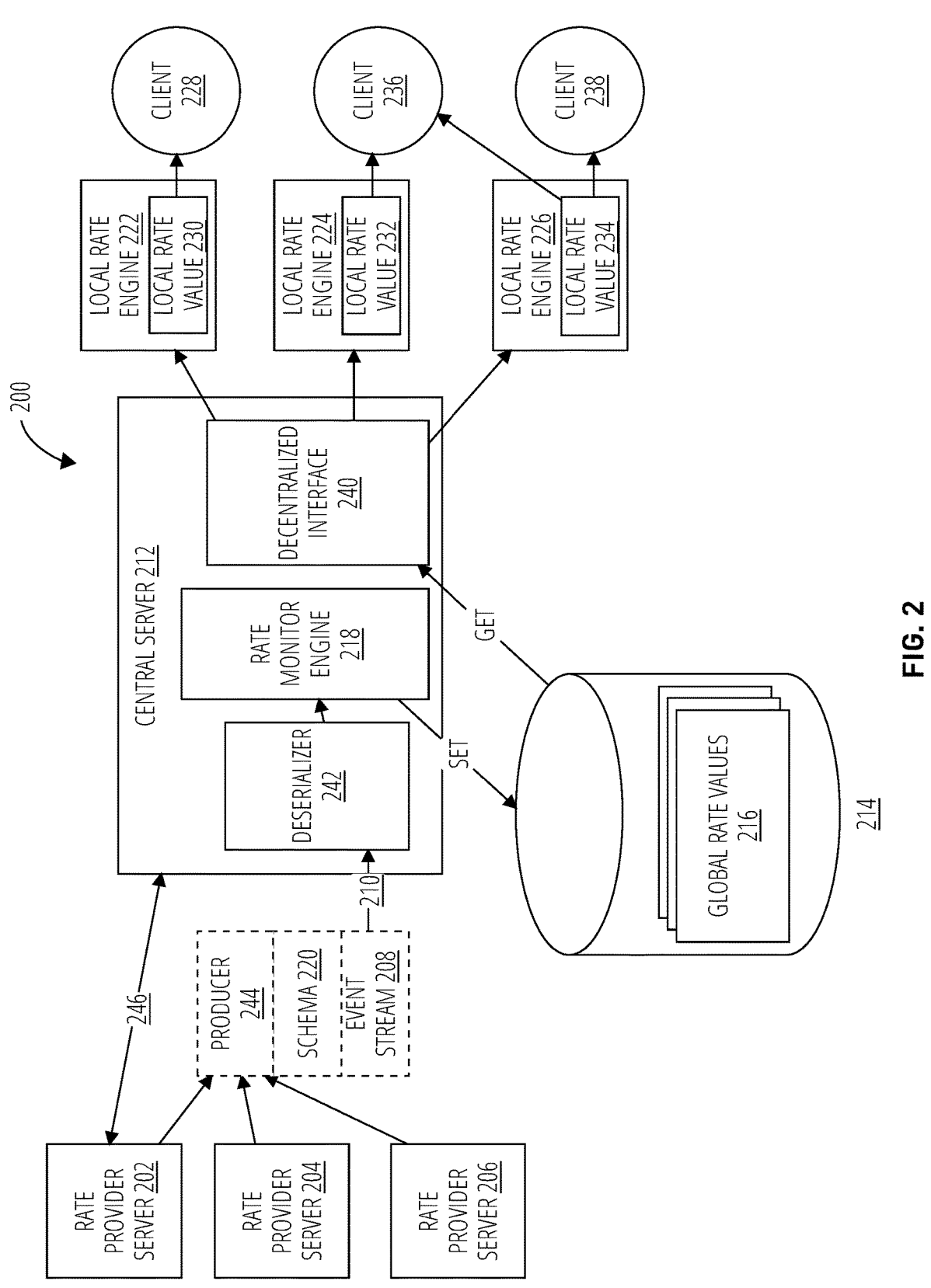
FIG. 2 shows a data processing system which may provide exchange rates to end users with a decentralized architecture, in accordance with an embodiment.

FIG. 2 shows an exemplary data processing system 200 that utilizes a decentralized architecture to provide exchange rates to end users. Components shown with respect to FIG. 2 may correspond to examples of components of FIG. 1. For example, each of the one or more rate provider servers (202, 204, 206) are examples of each parameter server 104, 106, and the exchange rate that each rate provider server provides may correspond to a parameter value with respect to FIG. 1. Similarly, local rate engines 222, 224, and 226 may correspond to one or more local servers 110, 112, and 114. Each client 228, 236, 238 may correspond to end user 126, 128, 130 or an intermediary server that services an end user.

In one embodiment, the system may be used to process transactions relating to exchange rates. A transaction with exchange rates may collect exchange rates from various sources, and these various sources may, at a given time, provide different exchange rate values for the same rate. Further, a given exchange rate may fluctuate over a time period. This disparity between different exchange rate providers, and fluctuations in the rate at a particular rate provider and/or over multiple rate providers is monitored by central server 212, so that the system can respond to these fluctuations and serve exchange rates to end users (or intermediary servers). The system can dynamically implement and adjust rules and controls that address potential issues caused by such fluctuation and disparities. In some embodiments, foreign exchange (FX) transactions can be categorized in two primary types. The first type of FX transaction is a cash-level or physical FX, which is when actual money leaves and enters an account. The second type of FX transaction is user-facing or logical FX. This second type of FX transaction may determine account balances shown to a user before and after the logical FX. For digital-based transactions (e.g., transactions that occur at least partially over a network of computers), physical and logical FX may occur at different times and, as a result, the two transactions may also use different rates. Physical FX happens at the rate that is set based on a certain provider (e.g., a bank, governing bodies, or other network-based source). Logical FX transactions are performed with the rate that a data processing system determines, such as, for example, an established mid-market rate by a service provider. Given the potential difference between the exchange rate used in the physical FX and that which is used in the logical FX transactions, the data processing platform may be left to make up the difference, thereby introducing risk to the data processing platform when facilitating such transactions, especially in the case of a fluctuating exchange rate, or disparate values for an exchange rate from different sources.

To address the introduction of risk to the data processing platform caused by rate provider servers providing different exchange rates or fluctuating rates, the system utilizes a rate monitor engine 218 in the central server 212 to monitor differences between providers for the same rate, and fluctuations for a given rate against one or more thresholds. In response to a threshold being satisfied, the system may implement and/or adjust a rule (e.g., to pin a particular rate to a designated rate provider, adjust weights associated with each rate provider, etc.), or apply a control to lock a rate for a given time period at a decentralized endpoint (e.g., a local rate engine).

For example, rate provider server 202 may provide an exchange rate of value X for currency A to currency B. Similarly, rate provider server 204 may provide an exchange rate of value Y for the same currency A to currency B. In response to this difference, the system may implement and/or adjust a rule to pin that corresponding rate (currency A to currency B) to provider 202 and/or apply a control to lock the corresponding local rate (local rate 230 which represents currency A to currency B) for a given time period at local rate engine 222. The same may be performed in response to fluctuation of a given rate surpassing a threshold.

In some embodiments, each rate provider server 204 may vary in technology, communication protocol, API, physical location, etc. In an example, a rate provider server 202 may be a dedicated exchange rate server. In an example, rate provider server 204 may include a credit service. In an example, rate provider service may be a general provider of market data, or a server that provides financial information from a financial institution. In an example, central server 202 may obtain each of the rates from corresponding rate provider servers directly over a computer network (e.g., through individual one or more API calls 246).

Additionally, or alternatively, central server 212 may consume some or all of these rates from an event stream 208 which may be integral to an event streaming platform. In some embodiments, the event stream 208 may utilize a variety of technologies or formats such as a distributed publish-subscribe messaging systems distributed real-time computation systems or streaming data flow engines of an event streaming platform. Event stream 208 may be implemented using a variety of architectures including a microservices architecture. An application having a microservice architecture may include a collection of individual services that are communicative coupled through communication protocols to provide an overall functionality to clients. These services may form one or more producers 244, event stream 208, and various supporting functionality. In an example, one or more producers 244 can produce content (e.g., rates) based on occurrence of events, such as an update to one or more parameters obtained from one or more parameter servers (as in FIG. 1), which, by example, may include one or more rate providers 202, 204, 206. In response to each event, one or more producers 244 can store the content (e.g., each rate value) as a record in a record container (e.g., a Kafka topic). Each record may include the rate value associated with a given rate, or more generally, a parameter value associated with a given parameter. Further, each record may include metadata describing which rate provider server (or parameter server) provided that rate value. Central server 212, which may be referred to as a consumer of the event stream, can process this content by consuming records 210 from the event stream 208. The central server 212 may consume each record based on the format of the records, as defined by schema 220. In an example, each record 210 can be a byte array, and the schema 220 defines the structure of the byte array, such as, for example, the order, size, number of, or type of fields in the record. Deserializer 242 may unpack each record (e.g., byte by byte) in accordance with the specified format as defined by schema 220.

Rate monitor engine 218 may monitor each rate value for fluctuations of a rate and differences between rate values for that rate as provided from different rate provider servers. These fluctuations or differences can be monitored with respect to one or more thresholds. Rate monitor engine 218 may determine global rate values 216 based on the obtained rate values from the rate provider servers. Rate monitor engine 218 may determine each of the global rate values 216 serially (e.g., one by one) and repeatedly update each global rate value as the corresponding rate value is obtained from the event stream. Central server 212 may persist each global rate in database 214. Global rate values 216 may comprise a list of rates determined by central server 212. These global rate values 216 may be referred to as canonical rates that serve as a single source of truth for each rate, within data processing system 200. Each of the rate provider servers may provide one or more rates to central server 212, and these rates may fluctuate over time. Rate monitor engine 218 may analyze rates for fluctuations, and analyze differences between the same rate from different sources, and determine a corresponding global rate value according to a rule. The rule may indicate the designated rate provider server that a given rate is pinned to, or one or more weights applicable to each rate provider server to combine values received from those rate provider servers to generate the corresponding global rate value 216. Rate monitor engine 218 may determine each rate value based on one or more rules (e.g., dynamic and/or static rules, as described in other sections). Rules may be rate-specific-how one rate is determined may be different from how another rate is determined. Rate monitor engine 218 may refer dynamic or static rules that are applied dynamically by rate monitor engine 218 each time a rate value is received. A dynamic or static rule may comprise a machine executable instruction (e.g., pin rate to rate provider X, or adjust weight up or down) in response to a condition (e.g., when a fluctuation or difference threshold is satisfied). Each rule may be configurable manually by an operator, or adjusted in response to fluctuations, or both, as described in other sections. In an example, in response to a fluctuation or difference satisfying a threshold, central server 212 may transmit signaling to producer 244 to reduce a rate of consumption from a select rate provider. For example, if rate values (for a given rate) from rate provider server 202 are detected to fluctuate above a threshold, central server 212 may transmit signaling to producer 244 to halt consumption of rate values from rate provider server 202, to reduce computational load at the event streaming platform (244, 208), and at the central server 212.

Decentralized interface 240 may comprise one or more API that interact with local rate engines 222, 224, 226. Each local rate engine 222 may request a specified rate at a given time and serve a local version of this rate to a client. For example, at time T1, client 228 may perform a transaction that involves two parties from different countries. A buyer may wish to purchase a product with currency A, but the seller may require receiving payment through currency B. In such a case, local rate engine 222 receives from central server 212, the corresponding one of global rates 216, and uses this rate to determine local rate 230. The local rate engine 222 may determine local rate 230 using the global rate as a baseline, and increase or decrease the rate based on one or more control parameters, as described with respect to FIG. 4. In an embodiment, local rate engine 222 may apply a rate lock locally to local rate 230, such that even if the corresponding one of stored global rate values 216 changes, the local rate value 230 at local rate engine 222 remains locked at the same value for a specified period of the lock. This period may be specified by the central server 212.

Multiple rate engines may be deployed simultaneously to spread the task of servicing the rates. In an example, different local rate engines may service clients from different regions or different types of clients. For example, local rate engine 224 may be deployed on the network to serve a local rate value 232 to client 236, and local rate engine 226 may be deployed on the network to serve a local rate value 234 to client 238. Client 236 may be a web-based wholesale platform, and client 238 may be the back end of a single big-box brick and mortar retailer. Additionally, or alternatively, client 236 may be an intermediate service that receives the local rate value 234 from local rate engine 226, and serves this local rate value 234 to an end user (e.g., a web-based retailer, a financial institution, a brick and mortar retailer, etc.). A local rate engine may serve multiple clients (e.g., an end user or intermediate server), and clients may overlap between local rate engines. For example, client 236 may obtain rate values from local rate engine 224 and local rate engine 226. Each local rate engine may service each local rate value dynamically and in real-time, in response to a request from a respective client for a specified rate. For example, in response to client 228 requesting exchange rate for currency A to currency B, local rate engine 222 may transmit the current persisted local rate value 230, or if the time associated with when this local rate value 230 is determined to be beyond a threshold time, the local rate engine 222 may request the corresponding global rate through decentralized interface 240. Central server 212 may pull the corresponding global rate from database 214 and transmit it to local rate engine 222. Local rate engine 222 may determine a new local rate value 230 based on the received global rate and one or more controls, as described in other sections.

Each of the local rate engines may have exposed API for respective clients to request and obtain the respective local rates. The local rate engines may serve each local rate value in real-time. For the present disclosure, real-time may refer to a processing response by a processing logic that is performed with minimal delays such as, for example, transmission delays, processing delays, etc., but excludes longer intentional delays.

In an embodiment, decentralized interface 240 may broadcast global rate values 216 to the local rate engines. This broadcast may be performed periodically, or dynamically (e.g., in response to a change to the global rate values 216), or both. As described, transmitting to local rate engines may be performed to only those engines that have subscribed to a given rate. In another example, a hybrid rate distribution system may involve broadcasting a list of which rates have changed, and allowing each of the local engines to request a rate, as needed by the local engine.

Figure 3:
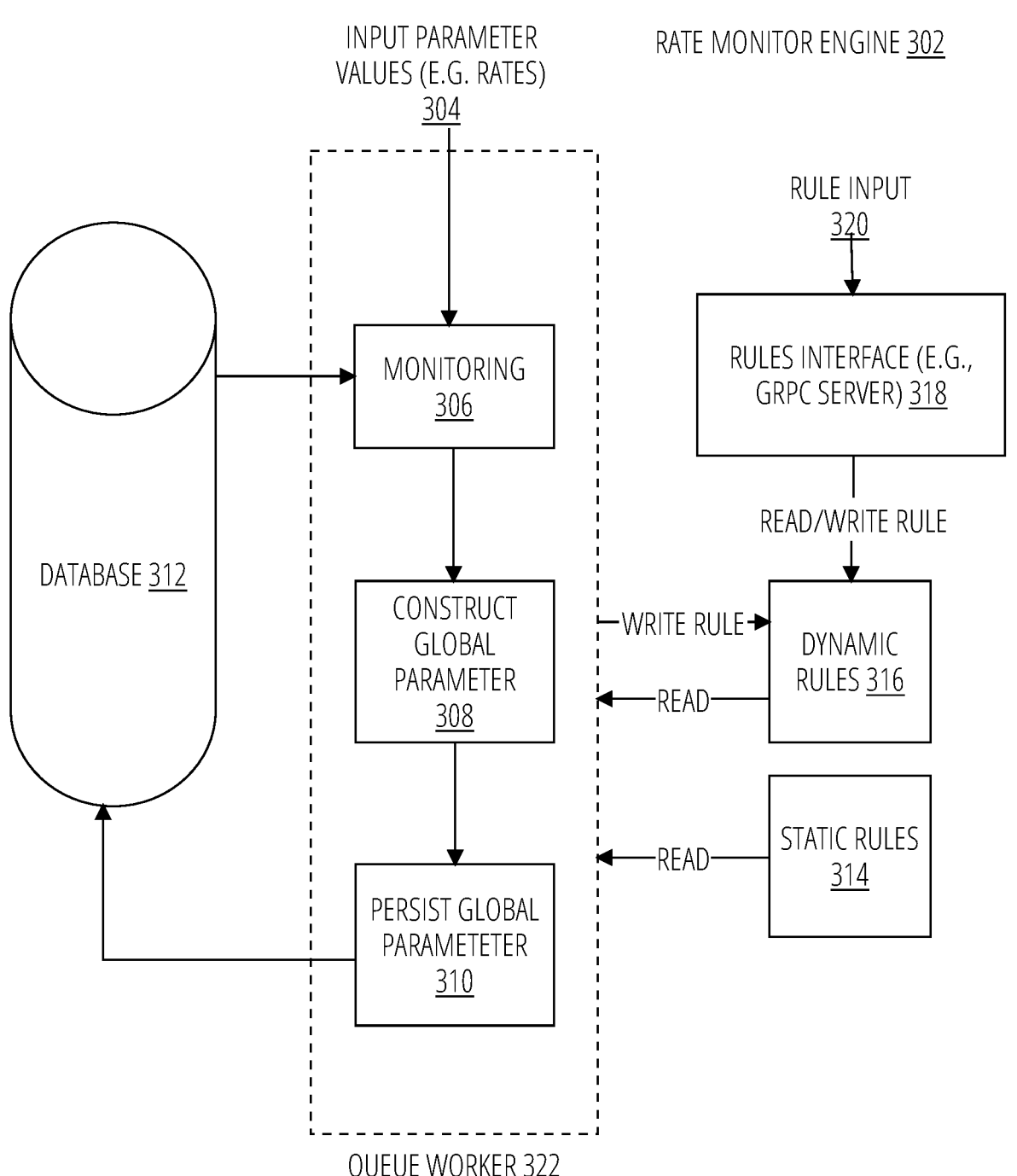
FIG. 3 shows an example workflow for determining one or more global rates, in accordance with an embodiment.

FIG. 3 shows an example workflow for determining one or more global rates, in accordance with an embodiment. Operations described may be performed by a processing logic of a rate monitor engine 302, which may be integral to a central server as described in the present disclosure in other figures. For example, rate monitor engine 302 may correspond to rate monitor engine 218, or may be integral to central server 102.

Rate monitor engine 302 may obtain input parameter values 304. In some examples, each input parameter value may be received serially (e.g., one at a time) based on when that parameter value is received from a parameter server (e.g., directly or indirectly through an event stream).

At monitoring block 306, rate monitor engine 302 may analyze each of the input parameter values 304 as they are received in real time (e.g., with minimal delay). The rate monitor engine 318 may determine whether a given parameter value from the same parameter server is fluctuating over time. Additionally, or alternatively, rate monitor engine 302 may compare the same parameter value (e.g., the exchange rate for a currency pair) from two or more different parameter servers. Further, the rate monitor engine may compare the current corresponding global parameter value (e.g., the global rate) stored in the database 312 to the received parameter value. In each case, rate monitor engine may determine whether a threshold is satisfied such as, for example, an amount of fluctuation of the parameter value of a parameter from the same source, a difference between parameter values for the same parameter from different parameter servers, and/or the difference between the stored global parameter value and the received parameter value. If that threshold is satisfied, the rate monitor engine 302 may automatically take remedial action such as transmitting an alert to one or more parties (e.g., an electronic notification, an email, etc.), adjusting a dynamic rule 316, or generate and transmit a control to a local server, or a combination thereof. Thresholds may be set by default and/or manually configured by a user. When a value surpasses a threshold, that threshold is deemed to be satisfied.

In an example, an exchange rate for currency A to currency B may be pinned to a first rate provider server, and an exchange rate for currency C to currency B may be pinned to a second rate provider server. When a particular parameter is pinned to a designed provider, the corresponding parameter value received from that provider is set as the global parameter value in the database 312.

Additionally, or alternatively, a global parameter value may be determined as a weighted average of the same parameter having a different value from two or more providers. For example, for determining the global parameter value corresponding to currency A to currency B, rate monitor engine may apply a first weight to the rate value from currency A to B received from a first parameter provider, apply a second weight to the rate value from currency A to B received from a second parameter provider, and average the weighted parameter values to determine the global parameter corresponding to currency A to currency B.

At block 308, rate monitor engine 302 may construct the global parameter value, based on the input parameter 304 and the one or more dynamic rules 316 and/or static rules 314. The dynamic rules and static rules include instructions that indicate how to calculate a global parameter value based on the received input parameter values 304. For example, a rule may pin a first parameter to a first parameter server, while a second rule includes instructs to calculate a global parameter value of a second parameter based on a specified weighting of a combination of parameter values (of that second parameter) from different parameter servers. In some cases, the dynamic rule may specify that if a parameter value from a first parameter server is older (e.g., has an older timestamp) than the parameter value from a second parameter server by a threshold amount, then the rate monitor engine 302 is to store the parameter value from the second parameter server as the global parameter value, or weight the second parameter server higher.

A dynamic rule 316 is one that the system automatically generates and/or adjusts in response to monitoring of rates, and a static rule 314 is a rule applied to the rates that does not change. Dynamic rules 316 and static rules 314 may define pinning and/or weighting for each global parameter.

As described, pinning is a designation of a parameter provider to be considered canonical for a particular parameter. Weighting refers to a weight associated with each parameter provider that can emphasize or deemphasize the contribution of that parameter provider's parameter value when determining computing the global parameter as a weighted combination (e.g., a weighted average) of the parameter values received from multiple parameter servers. Weights can be configured manually and/or automatically adjusted up or down based on detecting fluctuations associated with given parameter provider.

In an example, rate monitor engine 302 may automatically write to or modify dynamic rules 316 based on one or more criteria. For example, during the monitoring block 306, if one or more of the thresholds are satisfied, rate monitor engine 302 may write a dynamic rule that pins that parameter to a designated parameter provider. In an example, if the parameter value provided by a particular provider is fluctuating above a threshold amount, or deviates from the corresponding global parameter or from the same parameter of a different provider by a threshold, then the rate monitor engine 302 may write a dynamic rule that pins that parameter to a different provider. In an example, for computing the weighted average, weighting used for different parameter providers may vary depending on the degree of fluctuation.

In an example, in response to detecting fluctuation of a first parameter received from a first parameter provider exceeding a threshold, adjusting a dynamic rule 316 includes reducing the weight corresponding to the first parameter provider, which reduces the contribution of the value from that provider when calculating the global parameter value as a weighted combination. Alternatively, the dynamic rule 316 can be adjusted to pin that parameter to a different parameter provider if that parameter was previously pinned to the parameter provider associated with the fluctuating parameter values.

In an example, one or more users may manually provide rule input 320 through rules interface 318. Rules interface 318 may comprise a remote procedure call or other API to receive input from one or more users over a computer network. The rule input 320 may specify to read, write, or delete one of the dynamic rules 316. The input from the one or more uses may comprise a pinning rule as described above, or a manual override rule to set a given parameter (e.g., a specified exchange rate) at a specified value (e.g., a specified rate).

In addition, rate monitor engine 302 may comprise one or more static rules 314. These rules may similarly provide executable logic defining which parameter provider a given parameter will be pinned to (to determine the global parameter as) under a given condition or set of conditions such as, for example, those conditions described above. The static rules 314 may be non-changing over time. The dynamic rules 316 may change based on automated input from the rate monitor engine 302 (e.g., based on monitoring) and/or manually (based on rule input 320). For example, rule input 320 may specify to pin a parameter (e.g., an exchange rate from currency A to currency B) to a particular parameter provider. Similarly, rate monitor engine 302 may set a dynamic rule 320 to create such a pinning automatically (e.g., in response to detecting one of the thresholds being met). In an example, dynamic rule 316 may be adjusted to pin a parameter to a parameter provider that is fluctuating the least (e.g., has the lowest rate of change among the parameter servers or the lowest number of changes over a period of time for a given parameter).

In an example, global database 312 may have stored a list of persisted global parameter values. In an example, global database 312 may additionally have stored a respective list of historical parameters for each parameter value from each parameter server. Each stored parameter value may correspond to an exchange rate, and global database 312 may have stored each rate value for all supported currencies at a particular point in time. Each time a parameter value is received, the rate monitor engine 302 may check the rate of change of that parameter value with respect to a particular provider, and with respect to the stored global parameter, in real-time, and update dynamic rules 316 in response to the rate of change or a difference between parameters satisfying a threshold. The dynamic rules 316 may be persisted in memory and used for calculation of subsequent parameters.

In an embodiment, at block 308, the rate monitor engine 302 may determine the global parameter value exactly equal to the parameter value that is provided by the designated parameter provider. In an example, rate monitor engine 302 may determine the global parameter with a blending algorithm based on two of more of the same parameter provided by different parameter servers. A blending algorithm may derive the global parameter as a weighted combination of with different values (for the same parameter) provided by different parameter servers.

At block 310, rate monitor engine 302 may store the determined global parameter value to the database 312. This may include overwriting a stored parameter value of that parameter. Further, rate monitor engine 302 may store this global parameter value in an additional parameter list dedicated to the parameter server from which the parameter value was received. For example, rate monitor engine 302 may persist each parameter value received from parameter server A and store it in list A in the database 312, and store each parameter value from parameter serve B in a different list B, and so on. Rate monitor engine 302 may refer to a list in the future to determine if fluctuations from that parameter server for a particular parameter satisfies a threshold, and if so, construct or adjust a dynamic rule accordingly (e.g., designate a different parameter server or reduce weighting of that parameter server).

In an embodiment, rate monitor engine 302 may comprise a queue worker 322 that dispatches a separate worker for each input parameter (e.g., each rate). Each worker may have a separate set of compute resources (e.g., memory, processing bandwidth, etc.) to perform the task of monitoring, determining the global parameter value, and persisting the global parameter value. Resources given to a particular worker may be released and reallocated to the pool of workers upon completion of each task. The rate monitor engine 302 and queue worker 322 may be integral to the central server (e.g., 212, 102) thereby centralizing logic and resources related to monitoring parameter fluctuations and differences, and insulating local servers from these operations. As a result, local servers may determine and transmit locally managed parameter values with reduced latency.

Figure 4:
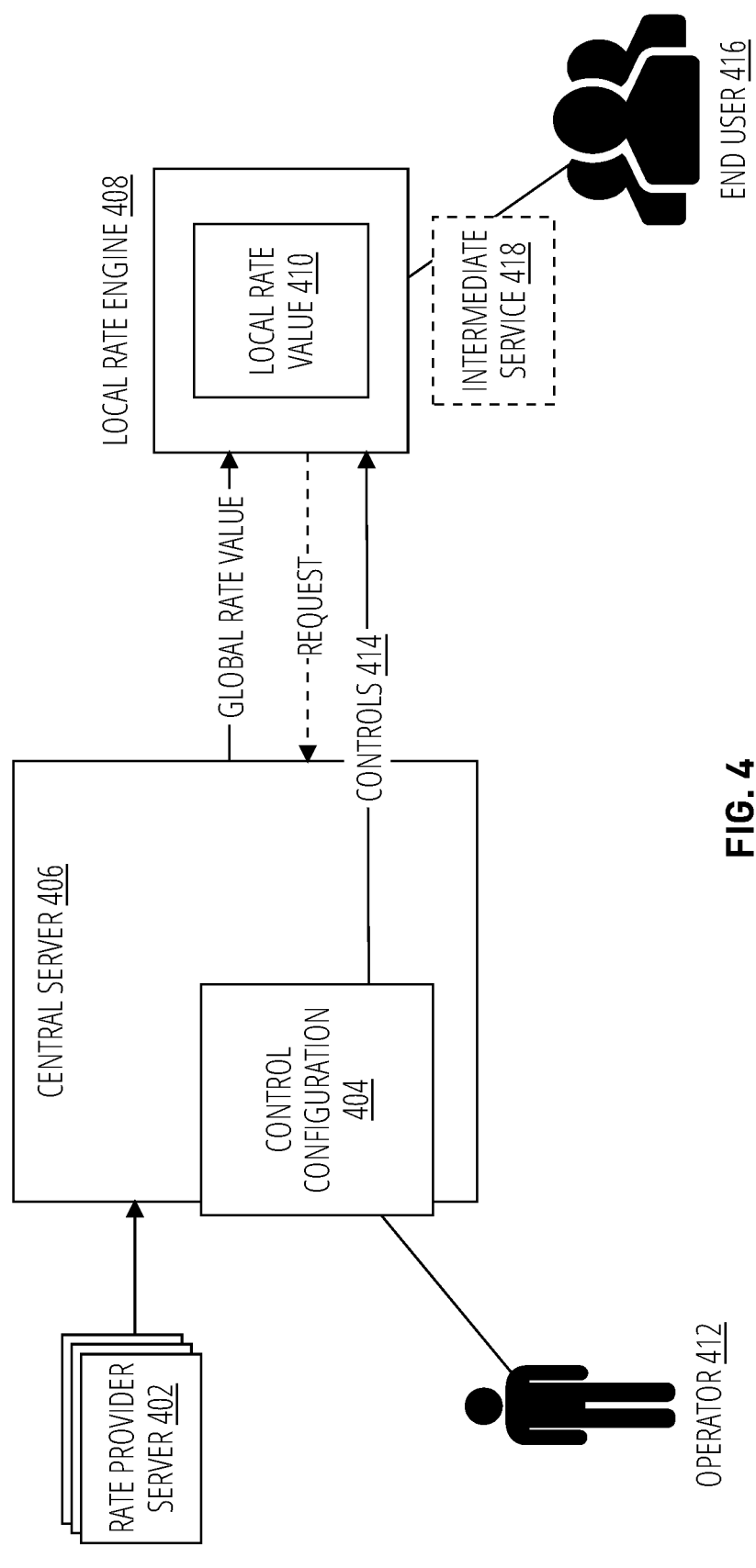
FIG. 4 shows an example of a local rate engine, in accordance with an embodiment.

FIG. 4 shows an example of a local rate engine, in accordance with an embodiment. Local rate engine 408 may correspond to a local rate engine or local server as described in other sections. A central server 406 may obtain rate values from a plurality of rate provider servers 402, and determine and persist a list of global rate values based on those rates, as described in other sections. Those global rate values serve as a canonical rate for which each local rate engine such as local rate engine 408 will base its own local rate value 410 on.

A local rate engine 408 may receive a global rate value from central server 406. This may be received as a broadcast from central server 406, or based on request. The local rate engine 408 may treat this global rate as a raw rate that will serve as a basis to determine a local rate value 410. The local rate engine 408 may serve this local rate value 410 to one or more end users, thereby insulating the central server 406 from end users and additional operations for determining the local rate 410.

In an embodiment, the local rate engine 408 determines the local rate value 410 based on the global rate and one or more controls 414. For example, one or more controls 414 may include one or more of: a hedging control adjustment, a risk control adjustment, a control that adds a value, and/or other controls. In an example, the local rate engine 408 calculates the local rate 410 based on the following:

Local Rate Value=Global Rate Value+Hedging Control+Risk Control+Added Value Control.

The Global Rate Value is the global rate value (the canonical rate) that is received from the central server 406. This may reflect the established mid-market rate, which is the midpoint between the bid and ask for a particular currency pair. In an example, mid-market rate may be reversible, for example, the mid-market rate for Currency A and Currency B may have the reversible property of: Currency A to Currency B=1/(Currency B to Currency A), the mid-market rate being the midpoint between the buy and sell prices of Currency A and Currency B. The hedging control represents a cost reduction taken by a trading partner (e.g., a third party) to trade the physical cash. The risk control represents an additional risk amount that the data processing system takes on when the system provides flexibility to the user, for example, when the system serves to an end user, a rate that is different from than the prevailing spot rate. In an example, the local rate engine 408 may attach a risk control to the calculation for a locked rate that is valid over a period of time (e.g., a specified number of hours). In another example, a rate provided to an end user outside of market hours may be determined by the local rate engine 408 with a risk control. Otherwise, the risk control may be nulled (e.g., zero). Additional value controls may also be implemented, but may be null by default.

In an example, control configuration 404 may define each of the one or more controls 414 within the central server 406. The central server 406 may comprise an API that exposes the control configuration 404 to one or more operators 412. The control configuration 404 may be managed (e.g., stored in memory, updated, and disseminated) by the central server 406. In an example, central server 406 may organize separate configurations specific to each rate or each local rate engine, or both.

The local rate engine 408 provides local rate value 410 to an end user 416. As discussed, the end user 416 may be any interested party in receiving the rate data such as, for example, a brick and mortar or web-based retailer, a financial institution, an e-commerce platform, etc. In some examples, the local rate engine may transmit the local rate value 410 to the end user 416 digitally over the computer network. In some examples, an optional intermediate service 418 may receive the local rate value 410 from the local rate engine 408 and serve this local rate value 410 to the end user 416.

FIG. 5 shows a flow diagram of a process 500 for monitoring and servicing one or more parameters with a decentralized architecture, according to an embodiment. The process 500 may be performed by processing logic that may comprise hardware (circuitry, dedicated logic, etc.), software (such as is run on a general purpose computer system or a dedicated machine), firmware, or a combination. The process 500 may be performed by a plurality of processors in a distributed architecture (e.g., a first server and one or more second servers). Process 500 may be performed by a data processing system as described in other figures.

At block 502, processing logic may receive over a network, at a first server, a plurality of parameter values corresponding to a first parameter provided by one or more parameter servers. The first server may correspond to a central server, as described in other sections. The one or more parameter servers may correspond to a parameter server as described in other sections. A first parameter server may provide a parameter value representing a first parameter. A second parameter server may provide a second parameter value representing the first parameter, and so on. Servers may provide conflicting values for the same parameter. For example, first server may provide value X for the conversion rate from currency A to currency B. Second server may provide a different value Y for the same conversion rate from currency A to currency B. It should be understood that processing logic receives multiple parameter values which may correspond to other parameters (e.g., a second parameter, a third parameter, etc.) and those parameter values may be received from any combination of different parameter servers.

At block 504, processing logic determines, based on the plurality of parameter values, a global parameter value. As described, processing logic may apply one or more rules (e.g., a static rule or dynamic rule) to determine the global parameter based on the corresponding one of the one or more parameters. In an example, each of the parameters correspond to an exchange rate received from a rate provider service. Each time a parameter is received, the message carrying the parameter (whether directly from the source or from an event stream) may carry metadata indicating the source of the parameter. Processing logic may parse this metadata (e.g., an address, a name, etc.) to determine the source of the parameter.

At block 506, processing logic persists, to a database, the global parameter value that corresponds to the first parameter. Processing logic may also persist the originally received parameter value to a separate list that is dedicated to the parameter server that provided the parameter value. A separate list may be stored for each parameter server to monitor fluctuations of a given parameter from that parameter server over time. This global parameter value may be transmitted to one or more second servers.

At block 508, processing logic transmits, from the one or more second servers, a local parameter value to a respective client, wherein the local parameter value is determined by each of the one or more second servers based on the global parameter value, and the local parameter value is different from at least one of the plurality of parameter values provided by the one or more parameter servers. The one or more second servers may correspond to a local server (e.g., a local rate engine), as described in other examples.

In an embodiment, receiving the one or more parameter values from the one or more parameter servers comprises receiving the one or more parameter values from an event stream that is configured to receive the one or more parameter values from the one or more parameter servers. The event streaming system may comprise a producer that interfaces with each of the one or more servers to receive a parameter value from the server. Each time a parameter is received by the producer, the producer adds the parameter to the event stream to be consumed by the first server.

In an embodiment, determining the global parameter value based on the plurality of parameter values comprises detecting fluctuation of one of the plurality of parameter values associated with the first parameter based on previous values associated with the first parameter, and in response to the fluctuation satisfying a threshold, adjusting a dynamic rule associated with the first parameter. For example, processing logic may adjust a rule to change a designated one of the one or parameter servers (pinning the parameter to a different parameter server) and to set the global parameter value as one of the plurality of parameter values corresponding to the newly designated one of the one or parameter servers, or to set the parameter value as a default parameter that may be hard-coded value, or an override value provided by an operator and stored in memory as a setting. In another example, processing logic may adjust a rule to adjust weighting to determine the global parameter value and to apply the weighting to determine the global parameter value as a weighted combination of the plurality of parameter values, also in response to the fluctuations satisfying the threshold.

In an embodiment, determining the global parameter value based on the plurality of parameter values comprises comparing a first of the plurality of parameter values from a first of the one or more parameter servers and a second of the plurality of parameter values from a second of the one or more parameter servers, and in response to a difference between the first of the plurality of parameter values and the second of the plurality of parameter values satisfying a threshold, adjusting one of the dynamic rules. For example, if a first server provides a value X for a parameter and a second server provides a different value Y for the same parameter, and the difference between value X and value Y is greater than a threshold, processing logic adjust dynamic rules. In an example, in response to such a scenario, processing logic may pin the parameter to a newly designated parameter server that has a lowest fluctuation for that parameter or has a highest weight associated with it, or has been tagged as a default parameter server for that parameter.

In an embodiment, determining the global parameter value based on the one or more parameter values comprises accessing, from the database, a prior version of the global parameter value, and comparing the prior version of the global parameter value to the one or more parameters. In response to a difference between the prior global parameter value and at least one of the one or more parameter values satisfying a threshold, processing logic may set the prior global parameter value as a default parameter value. For example, processing logic may access one or more historical parameters that correspond to the same parameter (e.g., an exchange rate between currency A and currency B) to determine a fluctuation. Generally, fluctuation can be determined as a rate of change or an instantaneous change of the same parameter from the same parameter server. If this fluctuation satisfies a threshold, processing logic may continue to use the previously stored global parameter value by setting it as the default value, or adjusting dynamic rules as described above.

In an embodiment, processing logic may transmit the global parameter value from the first server to the one or more second servers. The first server may access the database to obtain the global parameter value, and broadcasting the global parameter to the one or more second servers. The first server can broadcast or otherwise transmit each of the stored global parameter values to each of the second servers on a periodic basis, or as-needed, or both.

In an embodiment, processing logic of the first server further monitors the plurality of parameter values provided by the one or more parameter servers to detect a condition associated with: a difference between two of the plurality of parameter values satisfying a threshold, or a fluctuation of one of the plurality of parameter values associated with the first parameter based on previous values associated with the first parameter. In response to detecting the condition, processing logic transmits, from the first server, a notification to an operator that is associated with the global parameter value. Processing logic may further receive at the first server, from the operator, an override value associated with the corresponding global parameter value, and update the corresponding global parameter value in the database with the override value, which may be received through an input (e.g., rule input 320). The operator may provide rule inputs to the first server through a computer network using an API.

In an embodiment, each of the one or more parameter values received from a parameter server represents a rate (e.g., an exchange rate) associated with a first exchange medium (e.g., a first currency) and a second exchange medium (e.g., a second currency). Processing logic may persist a corresponding global parameter value in the database for each unique pairing of exchange mediums that are supported.

In an embodiment, determining the local parameter by the one or more second servers comprises receiving one or more controls from the first server, applying the one or more controls to the global parameter to compute the local parameter, or locking the local parameter for a time period defined by the one or more controls wherein the local parameter remains constant during the time period as the plurality of parameter values fluctuate, and persisting the local parameter. The one or more controls may include a hedging control, a risk control, an added value control, as described in other sections. In an embodiment, processing logic may transmit, from the first server to the one or more second servers, a control signal to lock the determined local parameter value at the one or more second servers for a time period. In response, the one or more second servers locks the local parameter value at that second server for the time period, regardless of fluctuations in the corresponding global parameter value. In an example, a control is generated and transmitted in response to detecting that a threshold is satisfied. For example, in response to detecting that the fluctuation or difference threshold is satisfied for a given parameter, processing logic may transmit controls to each of the one or more second servers to lock the local parameter value at that second server for that parameter.

Figure 6:
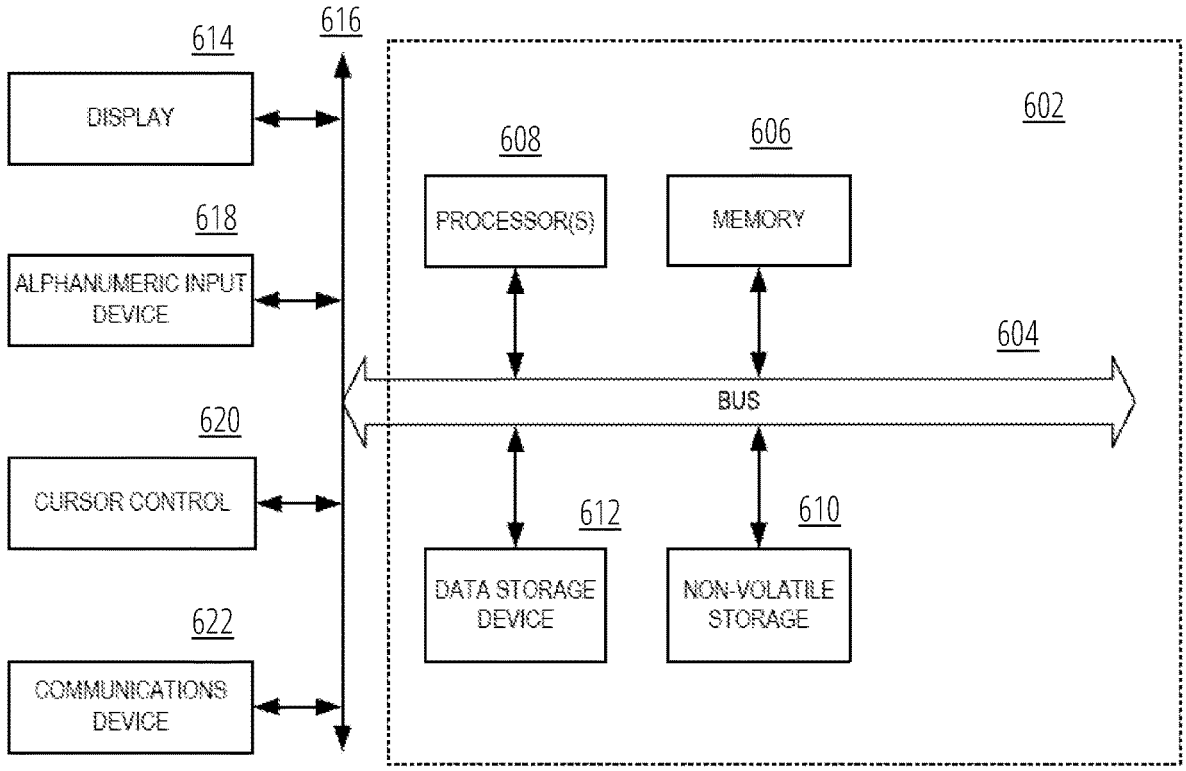
FIG. 6 is one embodiment of a computer system that may be used to support the systems and operations described, in accordance with an embodiment.

FIG. 6 is one embodiment of a computer system that may be used to support the systems and operations described, in accordance with an embodiment. For example, the computer system illustrated in FIG. 6 may be used by a commerce platform system, a merchant development system, merchant user system, etc. It will be apparent to those of ordinary skill in the art, however that other alternative systems of various system architectures may also be used.

The computer system 602 illustrated in FIG. 6 includes a bus or other internal communication means 604 for communicating information, and one or more processors 608 coupled to the bus 604 for processing information. The system further comprises a random access memory (RAM) or other volatile storage device 606 (referred to as memory), coupled to bus 604 for storing information and instructions to be executed by processor 608. Main memory 606 also may be used for storing temporary variables or other intermediate information during execution of instructions by processor 608. The system also comprises a read only memory (ROM), non-volatile storage, and/or static storage device 610 coupled to bus 604 for storing static information and instructions for processor 608, and a data storage device 612 such as a magnetic disk or optical disk and its corresponding disk drive. Data storage device 612 is coupled to bus 604 for storing information and instructions.

The system may further be coupled to a display device 614, such as a light emitting diode (LED) display, or a liquid crystal display (LCD) coupled to bus 604 through bus 616 for displaying information to a computer user. An alphanumeric input device 618, including alphanumeric and other keys, may also be coupled to bus 604 through bus 616 for communicating information and command selections to processor 608. An additional user input device is cursor control device 620, such as a touchpad, mouse, a trackball, stylus, or cursor direction keys coupled to bus 604 through bus 616 for communicating direction information and command selections to processor 608, and for controlling cursor movement on display device 614.

Another device, which may optionally be coupled to computer system 602, is a communication device 622 for accessing other nodes of a distributed system via a network. The communication device 622 may include any of a number of commercially available networking peripheral devices such as those used for coupling to an Ethernet, token ring, Internet, or wide area network. The communication device 622 may further be a null-modem connection, or any other mechanism that provides connectivity between the computer system 602 and the outside world. Note that any or all of the components of this system illustrated in FIG. 6 and associated hardware may be used in various embodiments as discussed herein.

It will be appreciated by those of ordinary skill in the art that any configuration of the system may be used for various purposes according to the particular implementation. The control logic or software implementing the described embodiments can be stored in main memory 606, mass storage device 612, or other storage medium locally or remotely accessible to processor 608.

It will be apparent to those of ordinary skill in the art that the system, method, and process described herein can be implemented as software stored in main memory 606 or read only memory and executed by processor 608. This control logic or software may also be resident on an article of manufacture comprising a computer readable medium having computer readable program code embodied therein and being readable by the mass storage device 612 and for causing the processor 608 to operate in accordance with the methods and teachings herein.

The embodiments discussed herein may also be embodied in a handheld or portable device containing a subset of the computer hardware components described above. For example, the handheld device may be configured to contain only the bus 604, the processor 608, and memory 606 and/or 612. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of embodiments for such a device would be apparent to one of ordinary skill in the art given the disclosure as provided herein.

The embodiments discussed herein may also be embodied in a special purpose appliance including a subset of the computer hardware components described above. For example, the appliance may include a processor 608, a data storage device 612, a bus 604, and memory 606, and only rudimentary communications mechanisms, such as a small touchscreen that permits the user to communicate in a basic manner with the device. In general, the more special purpose the device is, the fewer of the elements need be present for the device to function.

It is to be understood that the above description is intended to be illustrative, and not restrictive. Many other embodiments will be apparent to those of skill in the art upon reading and understanding the above description. The scope should, therefore, be determined with reference to the appended claims, along with the full scope of equivalents to which such claims are entitled.

The foregoing description, for purpose of explanation, has been described with reference to specific embodiments. However, the illustrative discussions above are not intended to be exhaustive or to limit the described embodiments to the precise forms disclosed. Many modifications and variations are possible in view of the above teachings. The embodiments were chosen and described in order to best explain the principles and practical applications of the various embodiments, to thereby enable others skilled in the art to best utilize the various embodiments with various modifications as may be suited to the particular use contemplated.

What is claimed is:

1. A method performed by a server computer system, comprising:

receiving over a network, at a first server of the server computer system, a plurality of parameter values corresponding to a first parameter, the plurality of parameter values being provided by one or more parameter servers;

determining, at the first server, a global parameter value based on the plurality of parameter values;

persisting the global parameter value to a database, the global parameter value corresponding to the first parameter;

transmitting, by the first server, the global parameter value to a second server of the server computer system;

following the transmission, receiving, at the second server, a request for a local parameter value from a user;

determining, by the second server, the local parameter value based on the global parameter value, wherein the local parameter value is different from at least one of the plurality of parameter values; and transmitting, by the second server, the local parameter value to the user;

wherein the second server insulates the first server from receiving the request from the user by handling the request at the second server without transmitting the request to the first server, and wherein determining the global parameter value based on the plurality of parameter values comprises:

detecting a fluctuation of one parameter value based on previous parameter values associated with the first parameter; and in response to the fluctuation satisfying a threshold, (1) setting the global parameter value as one of the plurality of parameter values, or (2) adjusting weighting to determine the global parameter value and applying the weighting as a weighted combination of the plurality of parameter values.

2. The method of claim 1, wherein receiving the plurality of parameter values from the one or more parameter servers comprises:

receiving the plurality of parameter values from an event stream of an event streaming system that is configured to receive the plurality of parameter values from the one or more parameter servers.

3. The method of claim 1, wherein determining the global parameter value based on the plurality of parameter values comprises:

comparing a first parameter value from a first parameter server with a second parameter value from a second parameter server; and in response to a difference between the first and second parameter values satisfying a threshold, (1) setting the global parameter value as one of the plurality of parameter values, or (2) adjusting weighting to determine the global parameter value and applying the weighting as a weighted combination of the plurality of parameter values.

4. The method of claim 1, wherein the first server accesses the database to obtain the global parameter value, and broadcasts the global parameter value to the second server to transmit the global parameter value to the second server.

5. The method of claim 1, further comprising:

monitoring the plurality of parameter values to detect a condition associated with: (1) a difference between two parameter values satisfying a threshold, or (2) a fluctuation of one parameter value based on previous parameter values associated with the first parameter; and in response to detecting the condition, transmitting a notification to an operator that is associated with the global parameter value.

6. The method of claim 5, further comprising:

receiving, from the operator, an override value associated with the global parameter value; and updating the global parameter value in the database with the override value.

7. The method of claim 1, wherein determining the local parameter value by the second server comprises:

receiving one or more controls from the first server, (1) applying the one or more controls to the global parameter value to determine the local parameter value, or (2) locking the local parameter value for a time period defined by the one or more controls such that the local parameter value remains constant during the time period as the plurality of parameter values fluctuate, and persisting the local parameter value.

8. The method of claim 7, wherein the one or more controls are generated and transmitted by the first server in response to detecting (1) a fluctuation of one parameter value satisfying a first threshold, or (2) a difference between two parameter values satisfying a second threshold.

9. The method of claim 1, wherein (1) the first parameter is one of the plurality of parameter values, (2) each parameter value represents a rate associated with a first exchange medium and a second exchange medium, and (3) a corresponding global parameter value is persisted in the database for each pairing of exchange mediums.

10. The method of claim 1, wherein the second server subscribes to the global parameter value.

11. The method of claim 4, wherein the first server broadcasts the global parameter value to the second server subsequent to a change of the global parameter value.

12. A server computer system comprising:

a memory, and one or more processors coupled with the memory configured to perform operations, comprising:

receiving over a network, at a first server of the server computer system, a plurality of parameter values corresponding to a first parameter, the plurality of parameter values being provided by one or more parameter servers;

determining, at the first server, a global parameter value based on the plurality of parameter values;

persisting the global parameter value to a database, the global parameter value corresponding to the first parameter;

transmitting, by the first server, the global parameter value to a second server of the server computer system;

following the transmission, receiving, at the second server, a request for a local parameter value from a user;

determining, by the second server, the local parameter value based on the global parameter value, wherein the local parameter value is different from at least one of the plurality of parameter values; and transmitting, by the second server, the local parameter value to a user respective;

wherein the second server insulates the first server from receiving the request from the user by handling the request at the second server without transmitting the request to the first server, and wherein determining the global parameter value based on the plurality of parameter values comprises:

detecting a fluctuation of one parameter value based on previous parameter values associated with the first parameter; and in response to the fluctuation satisfying a threshold, (1) setting the global parameter value as one of the plurality of parameter values, or (2) adjusting weighting to determine the global parameter value and applying the weighting as a weighted combination of the plurality of parameter values.

13. The server computer system of claim 12, wherein receiving the plurality of parameter values from the one or more parameter servers comprises:

receiving the plurality of parameter values from an event stream of an event streaming system that is configured to receive the plurality of parameter values from the one or more parameter servers.

14. The server computer system of claim 12, wherein determining the global parameter value based on the plurality of parameter values comprises:

comparing a first parameter value from a first parameter server with a second parameter value from a second parameter server; and in response to a difference between the first and second parameter values satisfying a threshold, (1) setting the global parameter value as one of the plurality of parameter values, (2) adjusting weighting to determine the global parameter value and applying the weighting as a weighted combination of the plurality of parameter values.

15. The server computer system of claim 12, wherein the first server accesses the database to obtain the global parameter value, and broadcasts the global parameter value to the second server to transmit the global parameter value to the second server.

16. The server computer system of claim 12, wherein the second server subscribes to the global parameter value.

17. A non-transitory computer readable storage medium storing instructions, which when executed by a server computer system, causes the server computer system to perform operations comprising:

receiving over a network, at a first server of the server computer system, a plurality of parameter values corresponding to a first parameter, the plurality of parameter values being provided by one or more parameter servers;

determining, at the first server, a global parameter value based on the plurality of parameter values;

persisting the global parameter value to a database, the global parameter value corresponding to the first parameter;

transmitting, by the first server, the global parameter value to a second server of the server computer system;

following the transmission, receiving, at the second server, a request for a local parameter value from a user;

determining, by the second server, the local parameter value based on the global parameter value, wherein the local parameter value is different from at least one of the plurality of parameter values; and transmitting, by the second server, the local parameter value to a user;

wherein the second server insulates the first server from receiving the request from the user by handling the request at the second server without transmitting the request to the first server, and wherein determining the global parameter value based on the plurality of parameter values comprises:

detecting a fluctuation of one parameter value based on previous parameter values associated with the first parameter; and in response to the fluctuation satisfying a threshold, (1) setting the global parameter value as one of the plurality of parameter values, or (2) adjusting weighting to determine the global parameter value and applying the weighting as a weighted combination of the plurality of parameter values.

18. The non-transitory computer readable storage medium of claim 17, wherein receiving the plurality of parameter values from the one or more parameter servers comprises:

receiving the plurality of parameter values from an event stream of an event streaming system that is configured to receive the plurality of parameter values from the one or more parameter servers.

19. The non-transitory computer readable storage medium of claim 17, wherein determining the global parameter value based on the plurality of parameter values comprises:

comparing a first parameter value from a first parameter server with a second parameter value from a second parameter server; and in response to a difference between the first and second parameter values satisfying a threshold, (1) setting the global parameter value as one of the plurality of parameter values, or (2) adjusting weighting to determine the global parameter value and applying the weighting as a weighted combination of the plurality of parameter values.

20. The non-transitory computer readable storage medium of claim 17, wherein the first server accesses the database to obtain the global parameter value, and broadcasts the global parameter value to second server to transmit the global parameter value to the second server.

* * * * *